(12) United States Patent
Zhai et al.

(10) Patent No.: US 12,202,583 B1
(45) Date of Patent: Jan. 21, 2025

(54) VISUALIZED BIOLOGICAL TRAWL NET SYSTEM BASED ON SUBMERSIBLE

(71) Applicant: Qingdao Institute of Marine Geology, Qingdao (CN)

(72) Inventors: Bin Zhai, Qingdao (CN); Xilin Zhang, Qingdao (CN); Zhilei Sun, Qingdao (CN); Ang Li, Qingdao (CN); Gang Dong, Qingdao (CN); Yunbao Sun, Qingdao (CN); Hong Cao, Qingdao (CN); Wei Geng, Qingdao (CN)

(73) Assignee: Qingdao Institute of Marine Geology, Qingdao (CN)

( * ) Notice: Subject to any disclaimer, the term of this patent is extended or adjusted under 35 U.S.C. 154(b) by 0 days.

(21) Appl. No.: 18/810,551

(22) Filed: Aug. 21, 2024

(30) Foreign Application Priority Data

Sep. 7, 2023 (CN) .......................... 202311146195.6

(51) Int. Cl.
*B63G 8/00* (2006.01)
*A01K 73/06* (2006.01)
*A01K 79/00* (2006.01)

(52) U.S. Cl.
CPC .............. *B63G 8/001* (2013.01); *A01K 73/06* (2013.01); *A01K 79/00* (2013.01); *B63G 2008/005* (2013.01)

(58) Field of Classification Search
CPC .. B63G 8/001; B63G 2008/005; A01K 73/06; A01K 79/00
See application file for complete search history.

(56) References Cited

U.S. PATENT DOCUMENTS

| 2015/0156998 A1* | 6/2015 | Terry | .................... | A01K 61/00 |
| | | | | 43/4.5 |
| 2017/0105397 A1* | 4/2017 | Terry | .................... | A01K 73/02 |

FOREIGN PATENT DOCUMENTS

| CN | 101509844 A | 8/2009 |
| CN | 101990864 A | 3/2011 |

(Continued)

OTHER PUBLICATIONS

Su Han, et al., Study and design of full-ocean-depth multi-purpose intelligent fishing device, Manufacturing Automation, 2020, pp. 20-23, vol. 42 Issue 4.

(Continued)

*Primary Examiner* — Anthony D Wiest

(74) *Attorney, Agent, or Firm* — Bayramoglu Law Offices LLC

(57) ABSTRACT

The provided is a visualized biological trawl net system based on a submersible. The visualized biological trawl net system based on a submersible includes a fixation frame, and further includes a collection net, a filtering mechanism, a fish school observation camera and a central control system. The collection net is arranged at a rear of the fixation frame and used for collecting marine creatures; the filtering mechanism is arranged inside the fixation frame, and the filtering mechanism is used for screening marine creatures entering the collection net; the fish school observation camera is arranged at a top of the fixation frame, and the fish school observation camera is used for observing marine creatures; and the central control system is electrically connected with the fish school observation camera and used for controlling the fish school observation camera to monitor marine creatures.

9 Claims, 12 Drawing Sheets

(56) References Cited

FOREIGN PATENT DOCUMENTS

| | | | |
|---|---|---|---|
| CN | 105101788 | A | 11/2015 |
| CN | 108445153 | A | 8/2018 |
| CN | 111953946 | A | 11/2020 |
| CN | 212752463 | U | 3/2021 |
| CN | 114994691 | A | 9/2022 |
| CN | 115997739 | A | 4/2023 |
| JP | 2000189000 | A | 7/2000 |
| JP | 2005046034 | A | 2/2005 |
| JP | 3233870 | U | 9/2021 |
| KR | 19980017495 | U | 7/1998 |
| WO | 2013042076 | A2 | 3/2013 |

OTHER PUBLICATIONS

Cai Wenyu, et al., Visual biological trawl system with plankton spectrum function, [J]. Application of Electronic Technique, 2016, pp. 53-55, 59, vol. 42 No. 4.

Chong Wei, et al., Overview of the Current Status of Deep-Sea Biological Capture Domestically and Internationally, 2010, pp. 3-6, vol. 9 No. 45.

\* cited by examiner

VISUALIZED BIOLOGICAL TRAWL NET SYSTEM BASED ON SUBMERSIBLE

CROSS-REFERENCE TO THE RELATED APPLICATIONS

This application is based upon and claims priority to Chinese Patent Application No. 202311146195.6, filed on Sep. 7, 2023, the entire contents of which are incorporated herein by reference.

BACKGROUND OF THE INVENTION

1. Technical Field

The invention belongs to the technical field of marine engineering, and particularly relates to a visualized biological trawl net system based on a submersible.

2. Description of Related Art

The most common method for studying deep-sea creatures is to collect samples from the seabed and conduct research on scientific research ships. Traditional sampling methods mainly involve the use of bottom trawl nets, samplers, or grabs to obtain biological samples. In recent years, with the emergence of deep-sea submersibles, integrated detection, filtration, and sampling technology is widely used abroad. This involves capturing biological samples using a siphon-like sampler with a mechanical arm for deep-sea operations. However, this integrated detection, filtration, and sampling technology can only work under preset sampling conditions, such as setting the sampling depth before sampling, which means that it cannot provide real-time online monitoring, real-time observation of the specific sampling situation, or adaptation to the complex underwater environment.

Existing biological sampling systems, which are based on bottom trawling, face challenges in effectively sampling deep-sea creatures. It is hard to obtain a complete deep-sea creature community sample and to precisely control the sampling water depth. Distinguishing the actual depths at which different deep-sea creature samples live is also difficult. The survival rate of captured deep-sea creature samples and the integrity and hierarchy of the community are hard to guarantee, but they are crucial for deep-sea creature sampling systems. Furthermore, when an existing trawl net is used, operators cannot observe the quantity of creatures or the status of the trawl net, and damage to the trawl net can only be noticed after retrieval, making it inconvenient for use.

BRIEF SUMMARY OF THE INVENTION

In view of this, the invention provides a visualized biological trawl net system based on a submersible, which can solve the problems that when a trawl net of an existing sampling system is used, operators cannot directly observe the quantity of creatures or the status of the trawl net, making it difficult to assess the integrity of the trawl net and inconvenient to use.

The invention is realized as follows.

The invention provides a visualized biological trawl net system based on a submersible, which comprises a fixation frame, and further comprises a collection net, a filtering mechanism, a fish observation camera and a central control system. The collection net is arranged at a rear of the fixation frame and used for collecting marine creatures; the filtering mechanism is arranged inside the fixation frame, and the filtering mechanism is used for screening marine creatures entering the collection net; the fish observation camera is arranged at a top of the fixation frame, and the fish observation camera is used for observing marine creatures; and the central control system is electrically connected with the fish observation camera and used for controlling the fish observation camera to monitor marine creatures.

The visualized biological trawl net system based on a submersible provided by the invention has the following technical effects: by providing the fish school observation camera, marine creatures can be observed, thus facilitating capture.

On the basis of the above technical scheme, the visualized biological trawl net system based on a submersible of the invention can be further improved as follows.

The collection net comprises an outer main collection net, the outer main collection net is fixedly connected to a rear side of the fixation frame, a fixation plate is fixed inside the fixation frame, a feeding net is fixed to a rear side of the fixation plate, and the feeding net is arranged inside the outer main collection net; a support ring frame is fixedly connected to a front middle section of the inside of the outer main collection net, and a rotating support is arranged inside the support ring frame in a rotary connection mode; a plurality of blades are fixed on one side of the rotating support, the blades are distributed in an annular array, the plurality of blades are arranged outside the feeding net, and the feeding net is rotatably connected with the rotating support; and a rotary collection net is fixedly connected to a rear side of the rotating support, a connecting plate is fixedly connected to a rear end of the outer main collection net, the rotary collection net is rotatably connected with the connecting plate, connecting pipes are fixedly connected to two ends of a rear side of the connecting plate respectively, and auxiliary collection nets are fixedly connected to rear sides of the two connecting pipes respectively.

Further, the filtering mechanism comprises filter screens, the filter screens are fixed to the fixation frame through the fixation plate, the filter screens are fixed to two sides of the fixation plate respectively, and the two filter screens are fixedly connected with the fixation frame.

Further, a plurality of struts are fixed to a front side of the connecting plate, and the plurality of struts are fixedly connected with the support ring frame; and the plurality of struts are attached to the inside of the outer main collection net, a mesh size of the rotary collection net is larger than that of the feeding net, and the mesh size of the feeding net is larger than that of the outer main collection net and the auxiliary collection net.

The above improvement scheme has the beneficial effects that the support ring frame and the outer main collection net are supported by the struts, so that the stability and strength of the outer main collection net are improved; and by making the mesh size of the rotary collection net larger than that of the feeding net, and the mesh size of the feeding net larger than that of the outer main collection net and the auxiliary collection net, the feeding net collects medium-sized marine creatures, the rotary collection net catches larger-sized marine creatures, and smaller-sized marine creatures drop from the inside of the rotary collection net to the outside of the rotary collection net, and then are collected by the two auxiliary collection nets.

Further, a sliding sleeve is fixed to a rear side of the connecting plate, a piston is slidably connected to the inside of the sliding sleeve, a plurality of through grooves are formed inside the piston, a sliding rod is fixedly connected to one side of the piston, and the sliding rod penetrates through a side wall of the sliding sleeve and is slidably connected with the sliding sleeve; a rear end of the sliding rod is fixedly connected with a support rod, sliding slots are formed in two ends of the support rod respectively, and sliders are slidably connected to the inside of the two sliding slots respectively; and connectors are fixedly connected to front sides of the two sliders respectively, and the two connectors are fixedly connected with the two auxiliary collection nets respectively.

The above improvement scheme has the beneficial effects that the sliding rod is made to penetrate through the side wall of the sliding sleeve and be slidably connected with the sliding sleeve, and the inside of the sliding sleeve is filled with buffer fluid to provide damping effects for the sliding movement of the piston and cushioning for the sliding rod; and because the connectors are fixedly connected to the front sides of the two sliders respectively, and the two connectors are fixedly connected with the two auxiliary collection nets respectively, when the two auxiliary collection nets move in the water, tail ends of the two auxiliary collection nets move to the middle due to the resistance of creatures inside and the auxiliary collection net itself, and the two connectors and the sliders are driven to move, so that the support rod moves backwards and the sliding rod provides cushioning for the support rod and supports the two auxiliary collection nets, thereby improving the stability of the auxiliary collection nets when being dragged.

Further, a plurality of hooks are fixedly connected to an outer side of the fixation frame, support arms are fixedly connected to two sides of the fixation frame respectively, and support plates are fixedly connected to front ends of the two support arms respectively; and rear net observation cameras are fixedly connected to one side of each of the two support plates, baffles are fixed to one side of each of the two support plates, a vertical plate is fixedly connected to the top of the fixation frame, and the fish school observation camera is fixedly connected to one side of the vertical plate.

The above improvement scheme has the beneficial effects that a feed inlet can be observed in real time by means of the net observation cameras; and because the baffles are fixed to one side of each of the two support plates, the net observation cameras are protected.

Further, an environmental observation module is connected to an output end of the central control system, a remote operated vehicle (ROV) control module and a docking module are connected to an output end of the environmental observation module, an input end of the ROV control module is connected with the central control system, and an input end of the docking module is connected with the central control system; a time positioning module is connected to the output end of the central control system, and a fish school monitoring module is connected to an output end of the time positioning module; a trawl net visual monitoring module is connected to the output end of the central control system, and a graphic processing module is further connected to the output end of the central control system; and output ends of the fish school monitoring module and the trawl net visual monitoring module are both connected with the graphic processing module, and a user terminal is connected to an input end of the central control system.

Further, the environmental observation module comprises a Beidou positioning unit, a pressure sensor, an angular velocity sensor, a conductivity-temperature-depth (CTD) sensor and a positioning correction unit;

the Beidou positioning unit is configured to determine a position of the visualized biological trawl net system;
the pressure sensor is configured to detect a current depth pressure of the visualized biological trawl net system;
the angular velocity sensor is configured to detect an angular velocity of the visualized biological trawl net system;
the CTD sensor is configured to detect a conductivity, temperature and depth of seawater;
the positioning correction unit is configured to redetermine the current position of the visualized biological trawl net system, so as to improve positioning accuracy through correction;
the ROV control module comprises a controller, an ROV driving unit and an ROV visual unit, and the controller is configured to control an ROV;
the ROV driving unit is configured to drive the ROV;
the ROV visual unit is configured to control the ROV to perform visual positioning;
the docking module comprises a vision camera positioning unit, a deck auxiliary docking unit, an ROV retrieval unit and an ROV deployment unit;
the vision camera positioning unit is configured to enable a vision camera to perform observation and positioning, so as to facilitate ROV docking;
the deck auxiliary docking unit is configured to control deck equipment to assist in ROV docking;
the ROV retrieval unit is configured to perform ROV retrieval; and
the ROV deployment unit is configured to control ROV deployment.

Further, the time positioning module comprises a unit for establishing display area points, a unit for acquiring graphic component data, a unit for calculating an area variable and a unit for adjusting an observation angle, an output end of the unit for establishing display area points is connected with the unit for acquiring graphic component data, an output end of the unit for acquiring graphic component data is connected with the unit for calculating an area variable, and an output end of the unit for calculating an area variable is connected with the unit for adjusting an observation angle; and the fish school monitoring module comprises a sonar monitoring unit, a coordinate system establishment unit, a fish school movement calculation unit and a calculation predictive compensation unit, an output end of the sonar monitoring unit is connected with the coordinate system establishment unit, an output end of the coordinate system establishment unit is connected with the fish school movement calculation unit, and an output end of the fish school movement calculation unit is connected with the calculation predictive compensation unit.

The above improvement scheme has the beneficial effects that by providing the unit for establishing display area points, the unit for acquiring graphic component data, the unit for calculating an area variable and the unit for adjusting an observation angle, fish school area points can be established by the unit for establishing display area points, an instruction can be given to the unit for acquiring graphic component data to obtain graphic component data, an instruction can be given to the unit for calculating an area variable to calculate variables, and an instruction can be given to the unit for adjusting an observation angle to adjust the angle of the vision camera, so as to alter the coverage range; and by providing the sonar monitoring unit, the coordinate system establishment unit, the fish school movement calculation unit and the calculation predictive compensation unit, fish school detection can be realized by the sonar monitoring unit, a coordinate system can be established for the position of the fish school by the coordinate system establishment unit, an instruction can be given to the fish school movement calculation unit to calculate the movement variables of the fish school, and the calculation predictive compensation unit can make predictive compensation for calculation results.

Further, the trawl net visual monitoring module comprises a graphic acquisition unit, a trawl net breakage detection unit, a main net capacity detection unit, a first auxiliary net capacity detection unit and a second auxiliary net capacity detection unit, an output end of the graphic acquisition unit is connected with the trawl net breakage detection unit, an output end of the trawl net breakage detection unit is connected with the main net capacity detection unit, and an output end of the main net capacity detection unit is connected with the first auxiliary net capacity detection unit and the second auxiliary net capacity detection unit; and the graphic processing module comprises a graphic extraction unit, an observation parameter recording unit, an observation parameter uploading unit, a penetration parameter storage unit and a data reading unit, an output end of the graphic extraction unit is connected with the observation parameter recording unit, an output end of the observation parameter recording unit is connected with the observation parameter uploading unit, an output end of the observation parameter uploading unit is connected with the penetration parameter storage unit, and an output end of the penetration parameter storage unit is connected with the data reading unit.

The above improvement scheme has the beneficial effects that by providing the graphic acquisition unit, the trawl net breakage detection unit, the main net capacity detection unit, the first auxiliary net capacity detection unit and the second auxiliary net capacity detection unit, image acquisition is realized by the graphic acquisition unit, the status of the trawl net in the image can be detected by the trawl net breakage detection unit, the internal capacity of the main net can be detected by the main net capacity detection unit, and the capacities of the two auxiliary nets can be detected by the first auxiliary net capacity detection unit and the second auxiliary net capacity detection unit; and by providing the graphic extraction unit, the observation parameter recording unit, the observation parameter uploading unit, the penetration parameter storage unit and the data reading unit, image extraction is realized by the graphic extraction unit, the graphic extraction unit can give instructions to the observation parameter recording unit to make the observation parameter recording unit record observation parameters, the parameters can be uploaded by the observation parameter uploading unit, then the penetration parameter storage unit stores the parameters, and the observation parameters can be read by the data reading unit.

Compared with the prior art, the visualized biological trawl net system based on a submersible provided by the invention has the beneficial effects that by means of the visualized biological trawl net system based on a submersible, marine creatures such as fish schools enter from the feeding net and then move along the rotating support into the rotary collection net; after entering the rotary collection net, the large mesh size of the rotary collection net allows smaller creatures to slip out through the mesh and fall into the outer main collection net; as the whole device moves forward, the creatures located in the outer main collection net move into the two auxiliary collection nets to be collected; as the outer main collection net moves, seawater is introduced into the outer main collection net from the filter screens, causing the seawater to impact the plurality of blades, so that the plurality of blades drive the rotating support to rotate and the rotating support drives the rotary collection net to rotate; as a result, small creatures in the rotary collection net are thrown out due to inertia, which facilitates the separation of creatures by size; additionally, the rotation of the rotary collection net can stimulate larger marine creatures, maintaining their vitality and reducing mortality; as small creatures fall into the two auxiliary collection nets, they are dragged along inside the auxiliary collection nets, experiencing resistance that causes the rear ends of the two auxiliary collection nets to draw closer to the center; the sliding sleeve is filled with buffer liquid, providing a damping effect as the piston slides inside the sliding sleeve, cushioning the sliding rod and driving the two connectors and the sliders to move, pushing the support rod backward, and making the sliding rod provide cushioning for the support rod and support the two auxiliary collection nets, so as to increase the stability of the auxiliary collection nets during dragging, reduce mechanical damage, and improve survival rates; the environmental observation module determines the position, gives an instruction to the ROV control module to control the ROV to move, and gives an instruction to the docking module to control the ROV to dock with a tugboat; the central control system gives an instruction to the time positioning module to perform visual positioning, so as to facilitate observation; the time positioning module gives an instruction to the fish school monitoring module to monitor the fish school; an instruction is sent to the graphic processing module to process the captured images of the fish school; the central control system gives an instruction to the trawl net visual monitoring module to monitor the trawl net, and the graphic processing module processes trawl net monitoring images; in this way, it is convenient to monitor both the trawl net and the fish school, thus enhancing the safety of trawl net use, and allowing real-time monitoring of the remaining capacity of the trawl net, which facilitates capture.

BRIEF DESCRIPTION OF THE SEVERAL VIEWS OF THE DRAWINGS

In order to explain the technical solution in the embodiments of the present invention more clearly, the drawings used in the embodiments will be briefly introduced below. Obviously, the drawings in the following description are only some embodiments of the present invention, and for those of ordinary skill in the art, other drawings can be obtained according to these drawings without paying creative labor.

Figure 1:
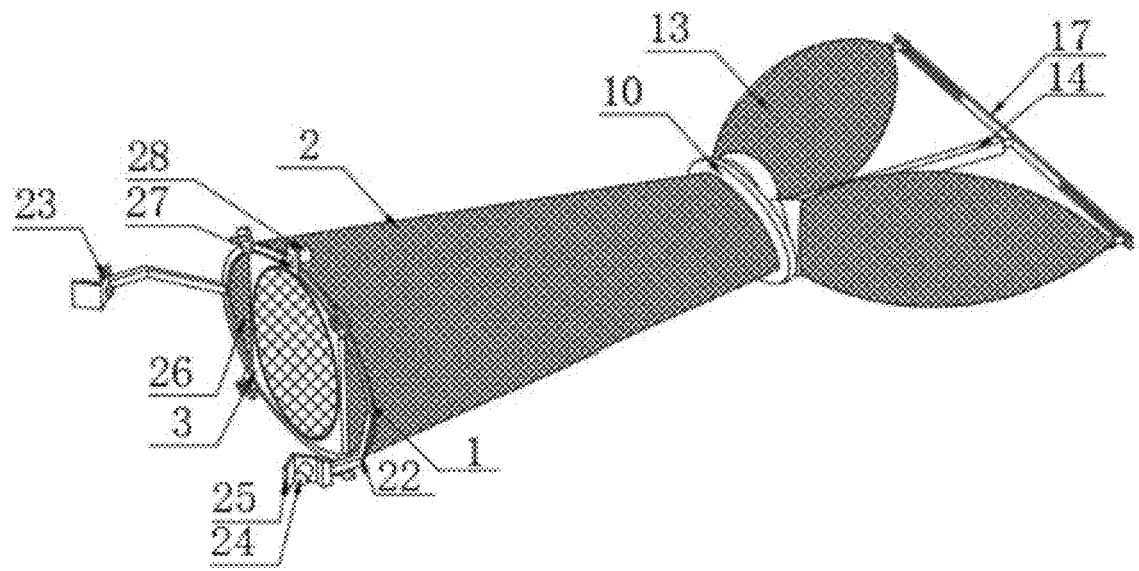
FIG. 1 is a schematic diagram of an overall structure of a visualized biological trawl net system based on a submersible.

DESCRIPTION OF REFERENCE NUMERALS 1. fixation frame; 2. outer main collection net; 3. fixation plate; 4. feeding net; 5. support ring frame; 6. rotating support; 7. rotary collection net; 8. strut; 9. blade; 10. connecting plate; 11. connecting pipe; 13. auxiliary collection net; 14. sliding sleeve; 15. sliding rod; 16. piston; 17. support rod; 18. slider; 19. connector; 20. sliding slot; 21. hook; 22. support arm; 23. support plate; 24. net observation camera; 25. baffle; 26. filter screen; 27. vertical plate; 28. fish school observation camera; 100. central control system; 200. environmental observation module; 201. Beidou positioning unit; 202. pressure sensor; 203. angular velocity sensor; 204. CTD sensor; 205. positioning correction unit; 300. ROV control module; 301. controller; 302. ROV driving unit; 303. ROV visual unit; 400. docking module; 401. vision camera positioning unit; 402. deck auxiliary docking unit; 403. ROV retrieval unit; 404. ROV deployment unit; 500. time positioning module; 501. unit for establishing display area points; 502. unit for acquiring graphic component data; 503. unit for calculating an area variable; 504. unit for adjusting an observation angle; 600. fish school monitoring module; 601. sonar monitoring unit; 602. coordinate system establishment unit; 603. fish movement calculation unit; 604. calculation predictive compensation unit; 700. trawl net visual monitoring module; 701. graphics acquisition unit; 702. trawl net breakage detection unit; 703. main net capacity detection unit; 704. first auxiliary net capacity detection unit; 705. second auxiliary net capacity detection unit; 800. graphic processing module; 801. graphic extraction unit; 802. observation parameter recording unit; 803. observation parameter uploading unit; 804. penetration parameter storage unit; 805. data reading unit; 900. user terminal.

DETAILED DESCRIPTION OF THE INVENTION

In order to make the objectives, technical schemes and advantages of the embodiments of the invention clearer, the technical schemes in the embodiments of the invention are clearly and completely described below with reference to the accompanying drawings in the embodiments of the invention.

Figure 2:
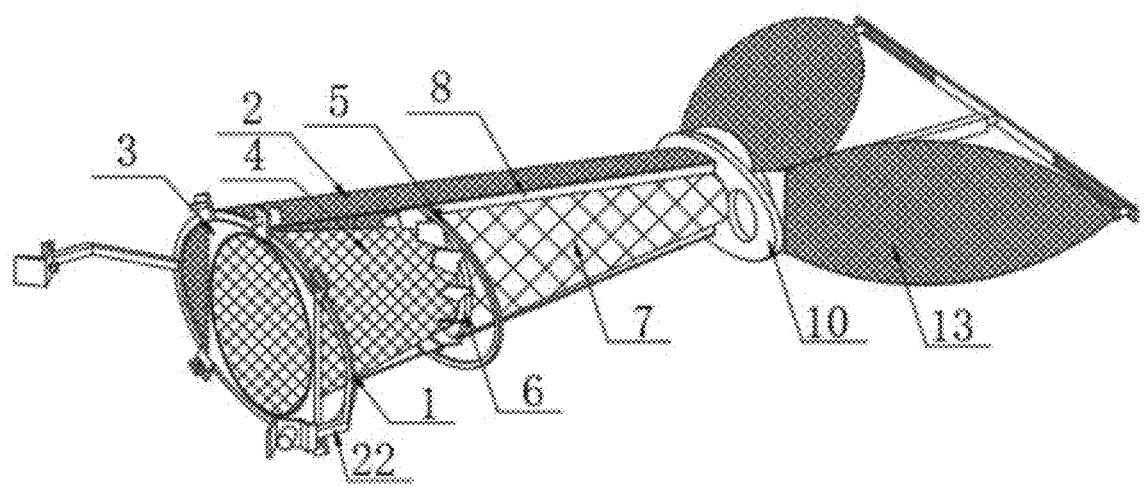
FIG. 2 is a partial sectional diagram of a local structure of a visualized biological trawl net system based on a submersible.
Figure 3:
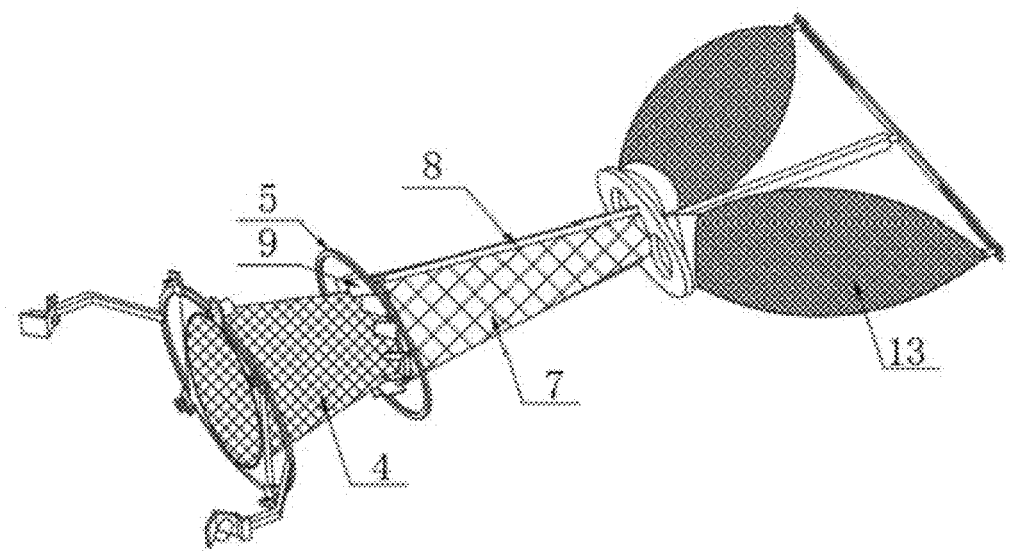
FIG. 3 is a structural diagram of a feeding net.
Figure 4:
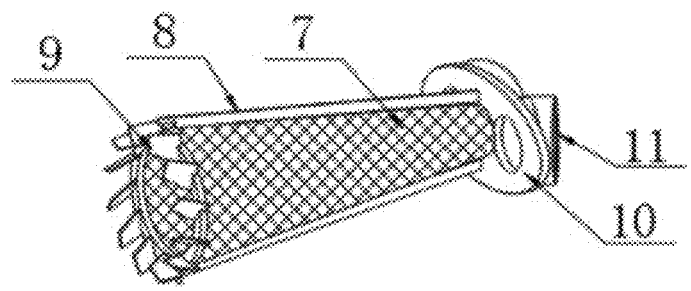
FIG. 4 is a structural diagram of a rotary collection net.
Figure 5:
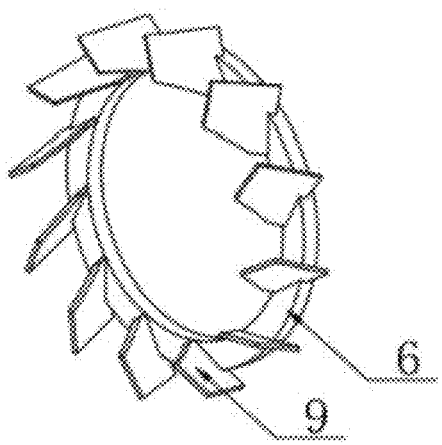
FIG. 5 is a structural diagram of a rotating support.
Figure 6:
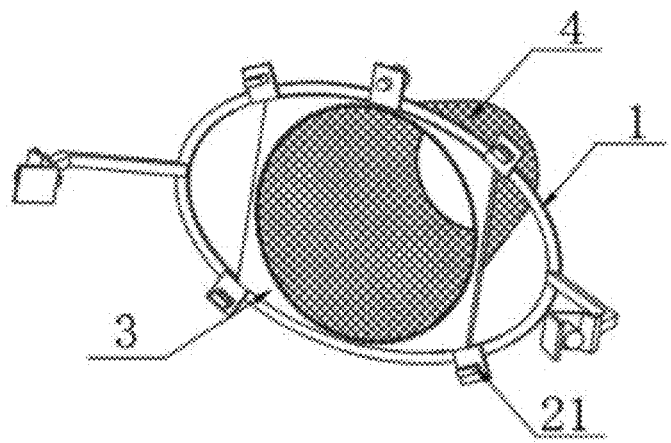
FIG. 6 is a structural diagram of a fixation frame.
Figure 7:
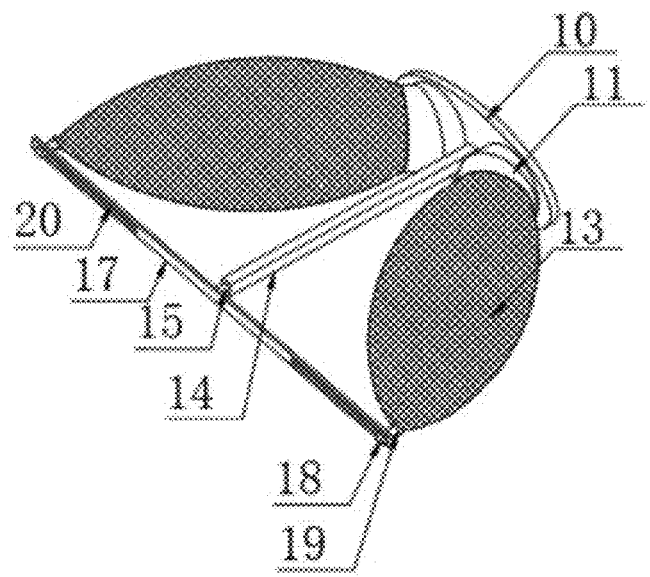
FIG. 7 is a structural diagram of an auxiliary collection net.
Figure 8:
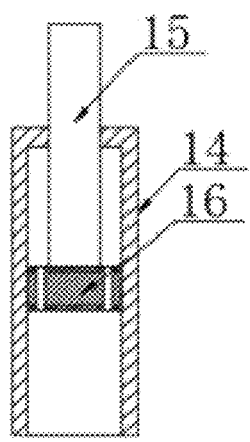
FIG. 8 is a structural diagram of a piston.
Figure 9:
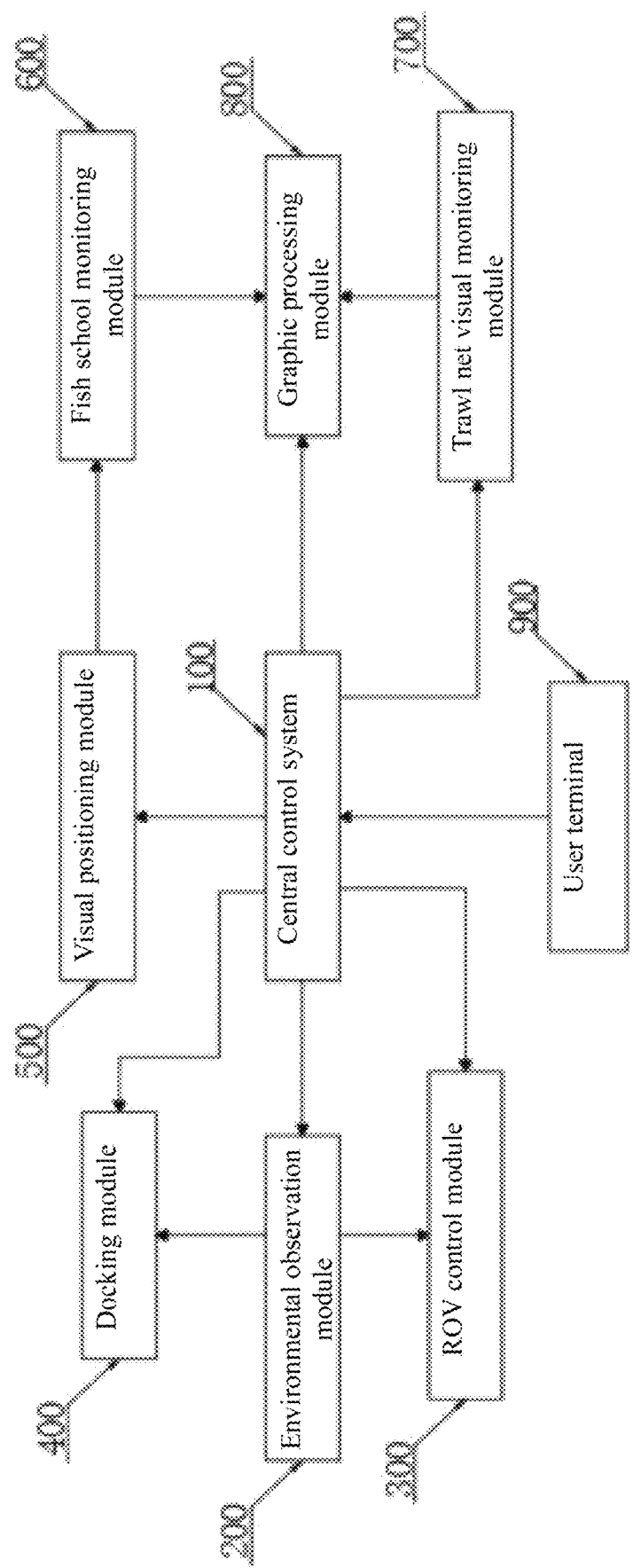
FIG. 9 is a diagram of a trawl net system.
Figure 10:
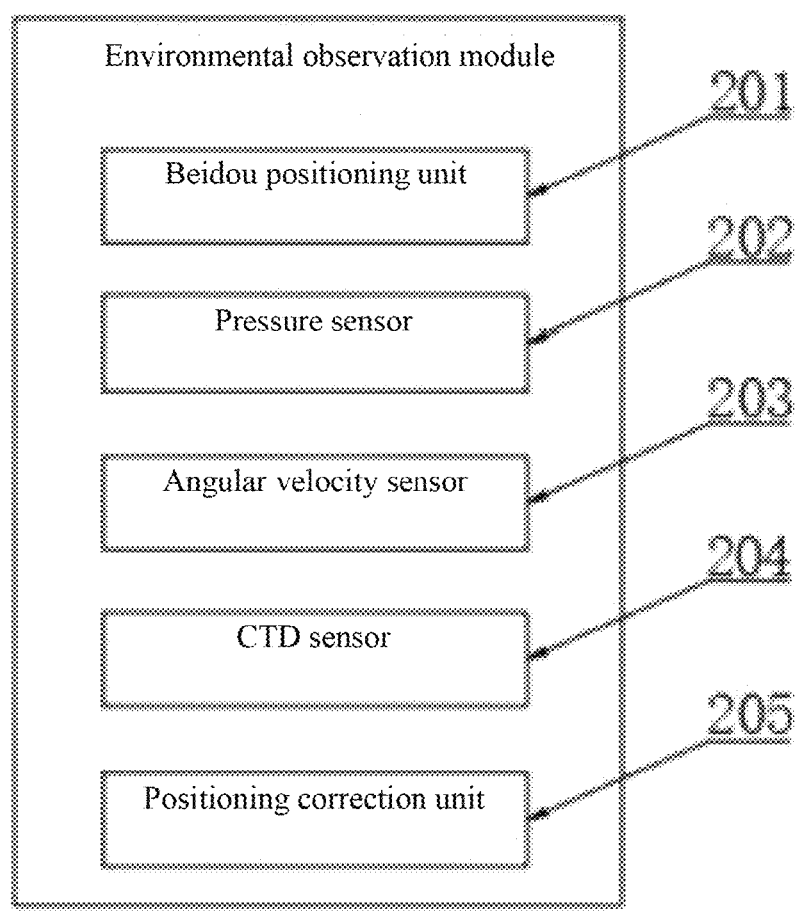
FIG. 10 is a diagram of an environmental observation module.
Figure 11:
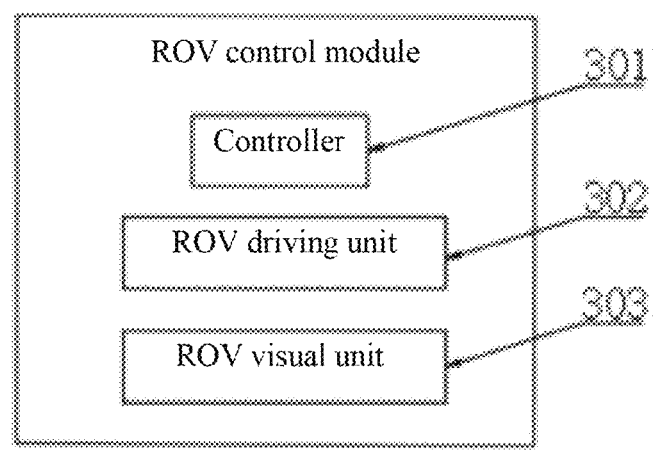
FIG. 11 is a diagram of an ROV control module.
Figure 12:
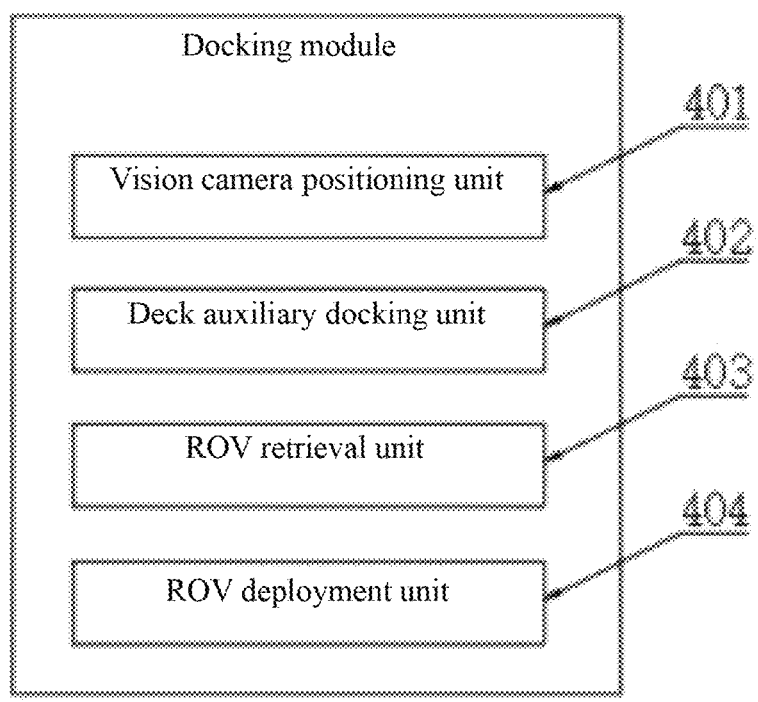
FIG. 12 is a diagram of a docking module.
Figure 13:
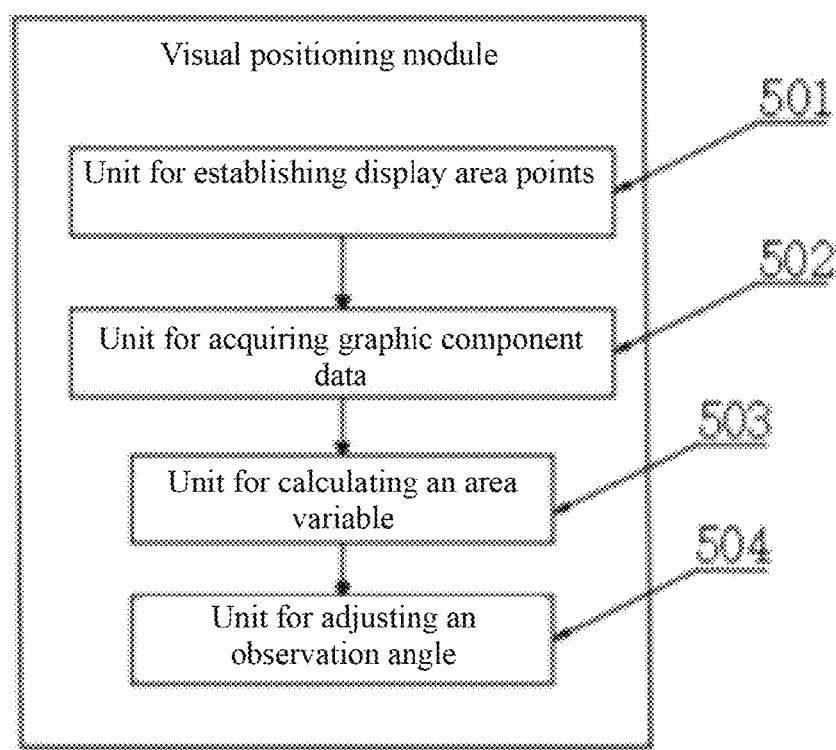
FIG. 13 is a diagram of a time positioning module.
Figure 14:
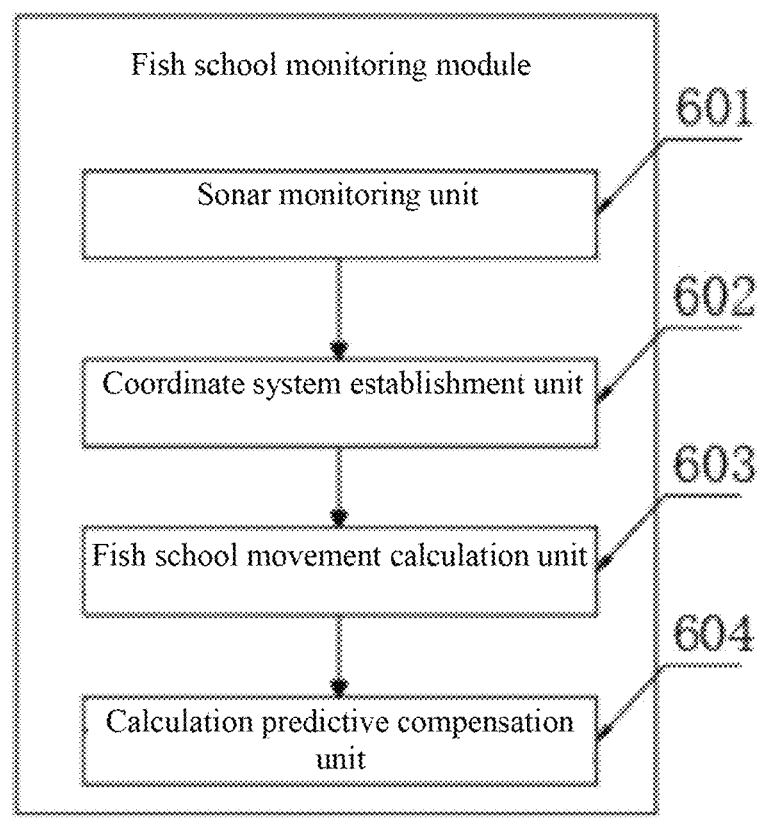
FIG. 14 is a diagram of a fish school monitoring module.
Figure 15:
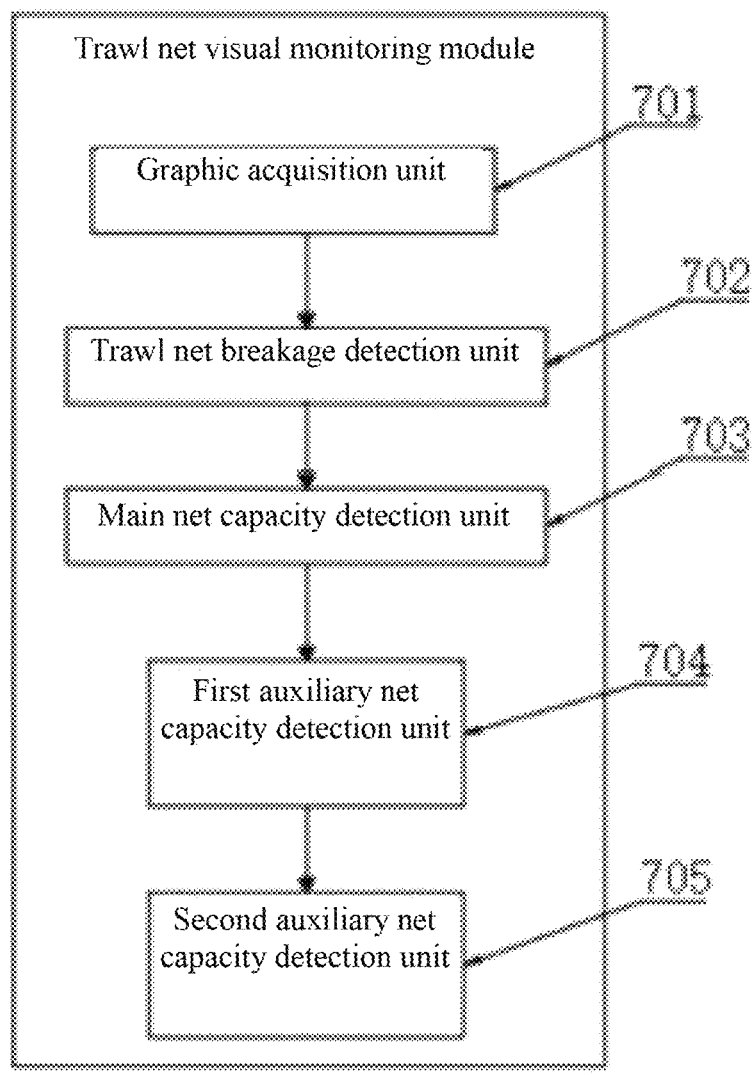
FIG. 15 is a diagram of a trawl net visual monitoring module.
Figure 16:
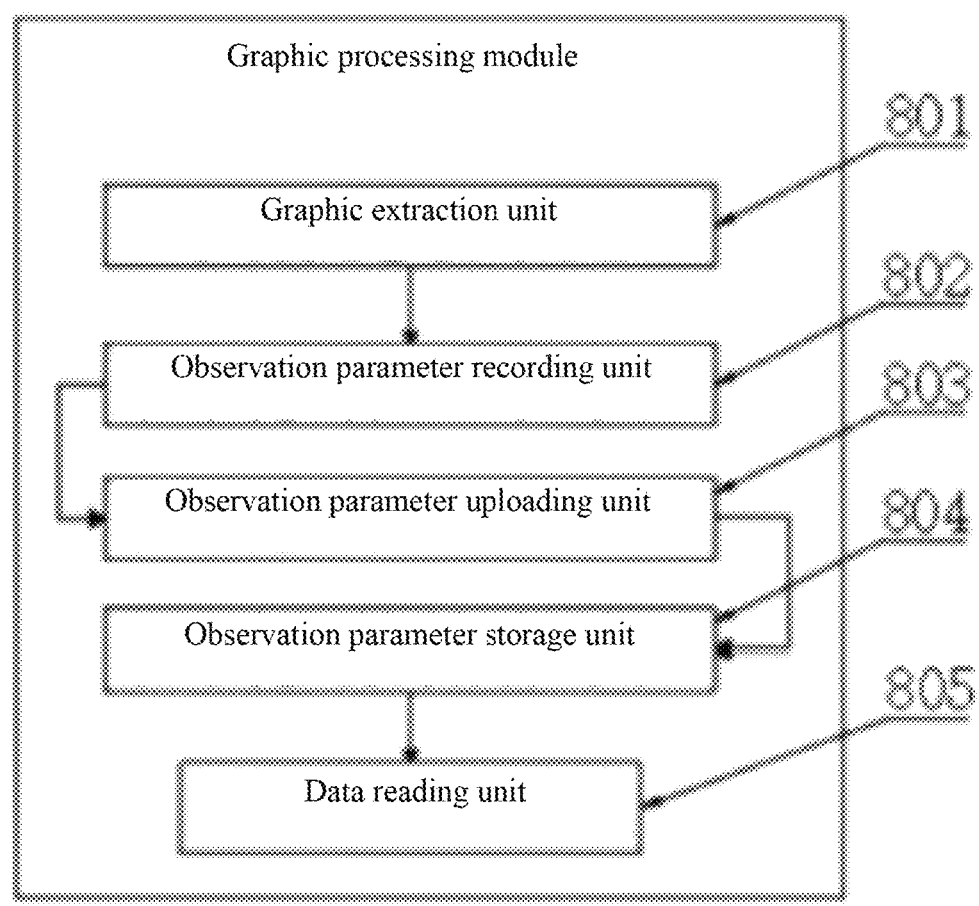
FIG. 16 is a diagram of a graphic processing module.

As shown in FIGS. 1-16 which are structural diagrams of a visualized biological trawl net system based on a submersible provided by the invention, the visualized biological trawl net system based on a submersible comprises a fixation frame 1, and further comprises a collection net, a filtering mechanism, a fish school observation camera 28 and a central control system 100. The collection net is arranged at a rear of the fixation frame 1 and used for collecting marine creatures; the filtering mechanism is arranged inside the fixation frame 1, and the filtering mechanism is used for screening marine creatures entering the collection net; the fish school observation camera 28 is arranged at a top of the fixation frame 1, and the fish school observation camera 28 is used for observing marine creatures; and the central control system 100 is electrically connected with the fish school observation camera 28 and used for controlling the fish school observation camera 28 to monitor marine creatures.

In the above technical scheme, the collection net comprises an outer main collection net 2, the outer main collection net 2 is fixedly connected to a rear side of the fixation frame 1, a fixation plate 3 is fixed inside the fixation frame 1, a feeding net 4 is fixed to a rear side of the fixation plate 3, and the feeding net 4 is arranged inside the outer main collection net 2; a support ring frame 5 is fixedly connected to a front middle section of the inside of the outer main collection net 2, and a rotating support 6 is arranged inside the support ring frame 5 in a rotary connection mode; a plurality of blades 9 are fixed on one side of the rotating support 6, the blades 9 are distributed in an annular array, the plurality of blades 9 are arranged outside the feeding net 4, and the feeding net 4 is rotatably connected with the rotating support 6; and a rotary collection net 7 is fixedly connected to a rear side of the rotating support 6, a connecting plate 10 is fixedly connected to a rear end of the outer main collection net 2, the rotary collection net 7 is rotatably connected with the connecting plate 10, connecting pipes 11 are fixedly connected to two ends of a rear side of the connecting plate 10 respectively, and auxiliary collection nets 13 are fixedly connected to rear sides of the two connecting pipes 11 respectively.

Further, in the above technical scheme, the filtering mechanism comprises filter screens 26, the filter screens 26 are fixed to the fixation frame 1 through the fixation plate 3, the filter screens 26 are fixed to two sides of the fixation plate 3 respectively, and the two filter screens 26 are fixedly connected with the fixation frame 1.

Further, in the above technical scheme, a plurality of struts 8 are fixed to a front side of the connecting plate 10, and the plurality of struts 8 are fixedly connected with the support ring frame 5; and the plurality of struts 8 are attached to the inside of the outer main collection net 2, a mesh size of the rotary collection net 7 is larger than that of the feeding net 4, and the mesh size of the feeding net 4 is larger than that of the outer main collection net 2 and the auxiliary collection net 13.

Further, in the above technical scheme, a sliding sleeve 14 is fixed to a rear side of the connecting plate 10, a piston 16 is slidably connected to the inside of the sliding sleeve 14, a plurality of through grooves are formed inside the piston 16, a sliding rod 15 is fixedly connected to one side of the piston 16, and the sliding rod 15 penetrates through a side wall of the sliding sleeve 14 and is slidably connected with the sliding sleeve 14; a rear end of the sliding rod 15 is fixedly connected with a support rod 17, sliding slots 20 are formed in two ends of the support rod 17 respectively, and sliders 18 are slidably connected to the inside of the two sliding slots 20 respectively; and connectors 19 are fixedly connected to front sides of the two sliders 18 respectively, and the two connectors 19 are fixedly connected with the two auxiliary collection nets 13 respectively.

Further, in the above technical scheme, a plurality of hooks 21 are fixedly connected to an outer side of the fixation frame 1, support arms 22 are fixedly connected to two sides of the fixation frame 1 respectively, and support plates 23 are fixedly connected to front ends of the two support arms 22 respectively; and rear net observation cameras 24 are fixedly connected to one side of each of the two support plates 23, baffles 25 are fixed to one side of each of the two support plates 23, a vertical plate 27 is fixedly connected to the top of the fixation frame 1, and the fish school observation camera 28 is fixedly connected to one side of the vertical plate 27.

When in use, the fish school observation camera 28 observes the position of the creatures, and transmits signals to the ROV, so that the ROV drives the outer main collection net 2 to move; the hook 21 is connected with the ROV through a cable, allowing the ROV to tow the fixation frame 1, so that the fixation frame 1 pulls the outer main collection net 2 to move, the fixation frame 1 drives the fixation plate 3 to move, and the fixation plate 3 drives the feeding net 4 to move; as the outer main collection net 2 and the feeding net 4 move, marine creatures such as fish schools enter from the feeding net 4 and then move along the rotating support 6 into the rotary collection net 7; after entering the rotary collection net 7, the large mesh size of the rotary collection net 7 allows smaller creatures to slip out through the mesh and fall into the outer main collection net 2; as the whole device moves forward, the creatures located in the outer main collection net 2 move into the two auxiliary collection nets 13 to be collected; as the outer main collection net 2 moves, seawater is introduced into the outer main collection net 2 from the filter screens 26, causing the seawater to impact the plurality of blades 9, so that the plurality of blades 9 drive the rotating support 6 to rotate and the rotating support 6 drives the rotary collection net 7 to rotate; as a result, small creatures in the rotary collection net 7 are thrown out due to inertia, which facilitates the separation of creatures by size; additionally, the rotation of the rotary collection net 7 can stimulate larger marine creatures, maintaining their vitality and reducing mortality; as small creatures fall into the two auxiliary collection nets 13, they are dragged along inside the auxiliary collection nets 13, experiencing resistance that causes the rear ends of the two auxiliary collection nets 13 to draw closer to the center; and the sliding sleeve 14 is filled with buffer liquid, providing a damping effect as the piston 16 slides inside the sliding sleeve 14, cushioning the sliding rod 15 and driving the two connectors 19 and the sliders 18 to move, pushing the support rod 17 backward, and making the sliding rod 15 provide cushioning for the support rod 17 and support the two auxiliary collection nets 13, so as to increase the stability of the auxiliary collection nets 13 during dragging, reduce mechanical damage, and improve survival rates.

Further, in the above technical scheme, an environmental observation module 200 is connected to an output end of the central control system 100, an ROV control module 300 and a docking module 400 are connected to an output end of the environmental observation module 200, an input end of the ROV control module 300 is connected with the central control system 100, and an input end of the docking module 400 is connected with the central control system 100; a time positioning module 500 is connected to the output end of the central control system 100, and a fish school monitoring module 600 is connected to an output end of the time positioning module 500; a trawl net visual monitoring module 700 is connected to the output end of the central control system 100, and a graphic processing module 800 is further connected to the output end of the central control system 100; and output ends of the fish school monitoring module 600 and the trawl net visual monitoring module 700 are both connected with the graphic processing module 800, and a user terminal 900 is connected to an input end of the central control system 100.

When in use, the user terminal 900 performs user login operations, the central control system 100 gives an instruction to the environmental observation module 200 to determine the position, and the environmental observation module 200 gives an instruction to the ROV control module 300 to control the ROV to move, and gives an instruction to the docking module 400 to control the ROV to dock with a tugboat; the central control system 100 gives an instruction to the time positioning module 500 to perform visual positioning, so as to facilitate observation; the time positioning module 500 gives an instruction to the fish school monitoring module 600 to monitor the fish school; an instruction is sent to the graphic processing module 800 to process the captured images of the fish school; the central control system 100 gives an instruction to the trawl net visual monitoring module 700 to monitor the trawl net, and the graphic processing module 800 processes trawl net monitoring images; in this way, it is convenient to monitor both the trawl net and the fish school, thus enhancing the safety of trawl net use, and allowing real-time monitoring of the remaining capacity of the trawl net, which facilitates capture.

The Beidou positioning unit 201 is configured to determine a position of the device; the pressure sensor 202 is configured to detect a current depth pressure; the angular velocity sensor 203 is configured to detect an angular velocity; the CTD sensor 204 is configured to detect a conductivity, temperature and depth of seawater; the positioning correction unit 205 is configured to redetermine the current position, so as to improve positioning accuracy through correction; the ROV control module 300 comprises a controller 301, an ROV driving unit 302 and an ROV visual unit 303, the controller 301 is configured to control an ROV, the ROV driving unit 302 is configured to drive the ROV to facilitate the control of ROV movement, and the ROV visual unit 303 is configured to control the ROV to perform visual positioning; the docking module 400 comprises a vision camera positioning unit 401, a deck auxiliary docking unit 402, an ROV retrieval unit 403 and an ROV deployment unit 404; the vision camera positioning unit 401 is configured to enable a vision camera to perform observation and positioning, so as to facilitate ROV docking; the deck auxiliary docking unit 402 is configured to control deck equipment to assist in ROV docking; the ROV retrieval unit 403 is configured to perform ROV retrieval; and the ROV deployment unit 404 is configured to control ROV deployment.

Fish school area points can be established by the unit for establishing display area points 501, an instruction can be given to the unit for acquiring graphic component data 502 to obtain graphic component data, an instruction can be given to the unit for calculating an area variable 503 to calculate variables, and an instruction can be given to the unit for adjusting an observation angle 504 to adjust the angle of the vision camera, so as to alter the coverage range; and fish school detection can be realized by the sonar monitoring unit 601, a coordinate system can be established for the position of the fish school by the coordinate system establishment unit 602, an instruction can be given to the fish school movement calculation unit 603 to calculate the movement variables of the fish school, and the calculation predictive compensation unit 604 can make predictive compensation for calculation results. Image acquisition is realized by the graphic acquisition unit 701, the status of the trawl net in the image can be detected by the trawl net breakage detection unit 702, the internal capacity of the main net can be detected by the main net capacity detection unit 703, and the capacities of the two auxiliary nets can be detected by the first auxiliary net capacity detection unit 704 and the second auxiliary net capacity detection unit 705; and image extraction is realized by the graphic extraction unit 801, the graphic extraction unit 801 can give instructions to the observation parameter recording unit 802 to make the observation parameter recording unit 802 record observation parameters, the parameters can be uploaded by the observation parameter uploading unit 803, then the penetration parameter storage unit 804 stores the parameters, and the observation parameters can be read by the data reading unit 805.

Further, in the above technical scheme, the environmental observation module 200 comprises a Beidou positioning unit 201, a pressure sensor 202, an angular velocity sensor 203, a CTD sensor 204 and a positioning correction unit 205;

the Beidou positioning unit 201 is configured to determine a position of the visualized biological trawl net system;

the pressure sensor 202 is configured to detect a current depth pressure of the visualized biological trawl net system;

the angular velocity sensor 203 is configured to detect an angular velocity of the visualized biological trawl net system;

the CTD sensor 204 is configured to detect a conductivity, temperature and depth of seawater;

the positioning correction unit 205 is configured to redetermine the current position of the visualized biological trawl net system, so as to improve positioning accuracy through correction;

the ROV control module 300 comprises a controller 301, an ROV driving unit 302 and an ROV visual unit 303, and the controller 301 is configured to control an ROV;

the ROV driving unit 302 is configured to drive the ROV;

the ROV visual unit 303 is configured to control the ROV to perform visual positioning;

the docking module 400 comprises a vision camera positioning unit 401, a deck auxiliary docking unit 402, an ROV retrieval unit 403 and an ROV deployment unit 404;

the vision camera positioning unit 401 is configured to enable a vision camera to perform observation and positioning, so as to facilitate ROV docking;

the deck auxiliary docking unit 402 is configured to control deck equipment to assist in ROV docking;

the ROV retrieval unit 403 is configured to perform ROV retrieval; and the ROV deployment unit 404 is configured to control ROV deployment.

Further, in the above technical scheme, the time positioning module 500 comprises a unit for establishing display area points 501, a unit for acquiring graphic component data 502, a unit for calculating an area variable 503 and a unit for adjusting an observation angle 504, an output end of the unit for establishing display area points 501 is connected with the unit for acquiring graphic component data 502, an output end of the unit for acquiring graphic component data 502 is connected with the unit for calculating an area variable 503, and an output end of the unit for calculating an area variable 503 is connected with the unit for adjusting an observation angle 504; and the fish school monitoring module 600 comprises a sonar monitoring unit 601, a coordinate system establishment unit 602, a fish school movement calculation unit 603 and a calculation predictive compensation unit 604, an output end of the sonar monitoring unit 601 is connected with the coordinate system establishment unit 602, an output end of the coordinate system establishment unit 602 is connected with the fish school movement calculation unit 603, and an output end of the fish school movement calculation unit 603 is connected with the calculation predictive compensation unit 604.

Further, in the above technical scheme, the trawl net visual monitoring module 700 comprises a graphic acquisition unit 701, a trawl net breakage detection unit 702, a main net capacity detection unit 703, a first auxiliary net capacity detection unit 704 and a second auxiliary net capacity detection unit 705, an output end of the graphic acquisition unit 701 is connected with the trawl net breakage detection unit 702, an output end of the trawl net breakage detection unit 702 is connected with the main net capacity detection unit 703, and an output end of the main net capacity detection unit 703 is connected with the first auxiliary net capacity detection unit 704 and the second auxiliary net capacity detection unit 705; and the graphic processing module 800 comprises a graphic extraction unit 801, an observation parameter recording unit 802, an observation parameter uploading unit 803, a penetration parameter storage unit 804 and a data reading unit 805, an output end of the graphic extraction unit 801 is connected with the observation parameter recording unit 802, an output end of the observation parameter recording unit 802 is connected with the observation parameter uploading unit 803, an output end of the observation parameter uploading unit 803 is connected with the penetration parameter storage unit 804, and an output end of the penetration parameter storage unit 804 is connected with the data reading unit 805.

Specifically, the principle of the invention is that: the fish school observation camera 28 observes the position of the creatures, and transmits signals to the ROV, so that the ROV drives the outer main collection net 2 to move; the hook 21 is connected with the ROV through a cable, allowing the ROV to tow the fixation frame 1, so that the fixation frame 1 pulls the outer main collection net 2 to move, the fixation frame 1 drives the fixation plate 3 to move, and the fixation plate 3 drives the feeding net 4 to move; as the outer main collection net 2 and the feeding net 4 move, marine creatures such as fish schools enter from the feeding net 4 and then move along the rotating support 6 into the rotary collection net 7; after entering the rotary collection net 7, the large mesh size of the rotary collection net 7 allows smaller creatures to slip out through the mesh and fall into the outer main collection net 2; as the whole device moves forward, the creatures located in the outer main collection net 2 move into the two auxiliary collection nets 13 to be collected; as the outer main collection net 2 moves, seawater is introduced into the outer main collection net 2 from the filter screens 26, causing the seawater to impact the plurality of blades 9, so that the plurality of blades 9 drive the rotating support 6 to rotate and the rotating support 6 drives the rotary collection net 7 to rotate; as a result, small creatures in the rotary collection net 7 are thrown out due to inertia, which facilitates the separation of creatures by size; additionally, the rotation of the rotary collection net 7 can stimulate larger marine creatures, maintaining their vitality and reducing mortality; as small creatures fall into the two auxiliary collection nets 13, they are dragged along inside the auxiliary collection nets 13, experiencing resistance that causes the rear ends of the two auxiliary collection nets 13 to draw closer to the center; and the sliding sleeve 14 is filled with buffer liquid, providing a damping effect as the piston 16 slides inside the sliding sleeve 14, cushioning the sliding rod 15 and driving the two connectors 19 and the sliders 18 to move, pushing the support rod 17 backward, and making the sliding rod 15 provide cushioning for the support rod 17 and support the two auxiliary collection nets 13, so as to increase the stability of the auxiliary collection nets 13 during dragging, reduce mechanical damage, and improve survival rates.

What is claimed is:

1. A visualized biological trawl net system based on a submersible, comprising a fixation frame, wherein the visualized biological trawl net system further comprises a collection net, a filtering mechanism, a fish school observation camera and a central control system, wherein the collection net is arranged at a rear of the fixation frame and configured for collecting marine creatures;

the filtering mechanism is arranged inside the fixation frame, and the filtering mechanism is configured for screening the marine creatures entering the collection net;

the fish school observation camera is arranged at a top of the fixation frame, and the fish school observation camera is configured for observing the marine creatures;

the central control system is electrically connected with the fish school observation camera and configured for controlling the fish school observation camera to monitor the marine creatures;

the collection net comprises an outer main collection net, the outer main collection net is fixedly connected to a rear side of the fixation frame, a fixation plate is fixed inside the fixation frame, a feeding net is fixed to a rear side of the fixation plate, and the feeding net is arranged inside the outer main collection net;

a support ring frame is fixedly connected to a front middle section of an inside of the outer main collection net, and a rotating support is arranged inside the support ring frame in a rotary connection mode;

a plurality of blades are fixed on one side of the rotating support, the plurality of blades are distributed in an annular array, the plurality of blades are arranged outside the feeding net, and the feeding net is rotatably connected with the rotating support; and a rotary collection net is fixedly connected to a rear side of the rotating support, a connecting plate is fixedly connected to a rear end of the outer main collection net, the rotary collection net is rotatably connected with the connecting plate, connecting pipes are fixedly connected to two ends of a rear side of the connecting plate, respectively, and auxiliary collection nets are fixedly connected to rear sides of the two connecting pipes, respectively.

2. The visualized biological trawl net system based on the submersible according to claim 1, wherein the filtering mechanism comprises filter screens, the filter screens are fixed to the fixation frame through the fixation plate, the filter screens are fixed to two sides of the fixation plate respectively, and the two filter screens are fixedly connected with the fixation frame.

3. The visualized biological trawl net system based on the submersible according to claim 2, wherein a plurality of struts are fixed to a front side of the connecting plate, and the plurality of struts are fixedly connected with the support ring frame; and the plurality of struts are attached to the inside of the outer main collection net, a mesh size of the rotary collection net is larger than a mesh size of the feeding net, and the mesh size of the feeding net is larger than a mesh size of the outer main collection net and the auxiliary collection net.

4. The visualized biological trawl net system based on the submersible according to claim 3, wherein a sliding sleeve is fixed to a rear side of the connecting plate, a piston is slidably connected to an inside of the sliding sleeve, a plurality of through grooves are formed inside the piston, a sliding rod is fixedly connected to one side of the piston, and the sliding rod penetrates through a side wall of the sliding sleeve and is slidably connected with the sliding sleeve;

a rear end of the sliding rod is fixedly connected with a support rod, sliding slots are formed in two ends of the support rod, respectively, and sliders are slidably connected to inside of the two sliding slots, respectively; and connectors are fixedly connected to front sides of the two sliders, respectively, and the two connectors are fixedly connected with the two auxiliary collection nets, respectively.

5. The visualized biological trawl net system based on the submersible according to claim 4, wherein a plurality of hooks are fixedly connected to an outer side of the fixation frame, support arms are fixedly connected to two sides of the fixation frame, respectively, and support plates are fixedly connected to front ends of the two support arms, respectively; and rear net observation cameras are fixedly connected to one side of each of the two support plates, baffles are fixed to one side of each of the two support plates, a vertical plate is fixedly connected to the top of the fixation frame, and the fish school observation camera is fixedly connected to one side of the vertical plate.

6. The visualized biological trawl net system based on the submersible according to claim 5, wherein an environmental observation module is connected to an output end of the central control system, a remote operated vehicle (ROV) control module and a docking module are connected to an output end of the environmental observation module, an input end of the ROV control module is connected with the central control system, and an input end of the docking module is connected with the central control system;

a time positioning module is connected to the output end of the central control system, and a fish school monitoring module is connected to an output end of the time positioning module;

a trawl net visual monitoring module is connected to the output end of the central control system, and a graphic processing module is further connected to the output end of the central control system; and output ends of the fish school monitoring module and the trawl net visual monitoring module are both connected with the graphic processing module, and a user terminal is connected to an input end of the central control system.

7. The visualized biological trawl net system based on the submersible according to claim 6, wherein the environmental observation module comprises a Beidou positioning unit, a pressure sensor, an angular velocity sensor, a conductivity-temperature-depth (CTD) sensor and a positioning correction unit;

the Beidou positioning unit is configured to determine a position of the visualized biological trawl net system;

the pressure sensor is configured to detect a current depth pressure of the visualized biological trawl net system;

the angular velocity sensor is configured to detect an angular velocity of the visualized biological trawl net system;

the CTD sensor is configured to detect a conductivity, temperature and depth of seawater;

the positioning correction unit is configured to redetermine a current position of the visualized biological trawl net system to improve positioning accuracy through correction;

the ROV control module comprises a controller, an ROV driving unit and an ROV visual unit, and the controller is configured to control an ROV;

the ROV driving unit is configured to drive the ROV;

the ROV visual unit is configured to control the ROV to perform visual positioning;

the docking module comprises a vision camera positioning unit, a deck auxiliary docking unit, an ROV retrieval unit and an ROV deployment unit;

the vision camera positioning unit is configured to enable a vision camera to perform observation and positioning to facilitate ROV docking;

the deck auxiliary docking unit is configured to control deck equipment to assist in ROV docking;

the ROV retrieval unit is configured to perform ROV retrieval; and the ROV deployment unit is configured to control ROV deployment.

8. The visualized biological trawl net system based on the submersible according to claim 7, wherein the time positioning module comprises a unit for establishing display area points, a unit for acquiring graphic component data, a unit for calculating an area variable and a unit for adjusting an observation angle, an output end of the unit for establishing display area points is connected with the unit for acquiring graphic component data, an output end of the unit for acquiring graphic component data is connected with the unit for calculating an area variable, and an output end of the unit for calculating an area variable is connected with the unit for adjusting an observation angle; and the fish school monitoring module comprises a sonar monitoring unit, a coordinate system establishment unit, a fish school movement calculation unit and a calculation predictive compensation unit, an output end of the sonar monitoring unit is connected with the coordinate system establishment unit, an output end of the coordinate system establishment unit is connected with the fish school movement calculation unit, and an output end of the fish school movement calculation unit is connected with the calculation predictive compensation unit.

9. The visualized biological trawl net system based on the submersible according to claim 8, wherein the trawl net visual monitoring module comprises a graphic acquisition unit, a trawl net breakage detection unit, a main net capacity detection unit, a first auxiliary net capacity detection unit and a second auxiliary net capacity detection unit, an output end of the graphic acquisition unit is connected with the trawl net breakage detection unit, an output end of the trawl net breakage detection unit is connected with the main net capacity detection unit, and an output end of the main net capacity detection unit is connected with the first auxiliary net capacity detection unit and the second auxiliary net capacity detection unit; and the graphic processing module comprises a graphic extraction unit, an observation parameter recording unit, an observation parameter uploading unit, a penetration parameter storage unit and a data reading unit, an output end of the graphic extraction unit is connected with the observation parameter recording unit, an output end of the observation parameter recording unit is connected with the observation parameter uploading unit, an output end of the observation parameter uploading unit is connected with the penetration parameter storage unit, and an output end of the penetration parameter storage unit is connected with the data reading unit.

* * * * *